United States Patent
Facchinello et al.

(10) Patent No.: US 10,166,849 B2
(45) Date of Patent: **\*Jan. 1, 2019**

(54) TONNEAU COVER SYSTEM AND MULTI-LINK AND/OR OVER-CENTER CLAMP

(71) Applicant: Extang Corporation, Ann Arbor, MI (US)

(72) Inventors: Jerome J. Facchinello, Grand Blanc, MI (US); Charles A. Fabros, Downers Grove, IL (US)

(73) Assignee: Extang Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,004

(22) Filed: Jan. 13, 2017

(65) Prior Publication Data

US 2017/0144522 A1    May 25, 2017

Related U.S. Application Data

(63) Continuation of application No. 14/875,911, filed on Oct. 6, 2015, now Pat. No. 9,545,835.

(60) Provisional application No. 62/060,637, filed on Oct. 7, 2014, provisional application No. 62/323,134, filed on Apr. 15, 2016.

(51) Int. Cl.
| | |
|---|---|
| *B60J 7/19* | (2006.01) |
| *F16B 2/18* | (2006.01) |
| *B60J 7/10* | (2006.01) |
| *B60J 7/14* | (2006.01) |

(52) U.S. Cl.
CPC .............. *B60J 7/198* (2013.01); *B60J 7/106* (2013.01); *B60J 7/141* (2013.01); *F16B 2/185* (2013.01); *B60J 7/102* (2013.01)

(58) Field of Classification Search
CPC ... B60J 7/198; B60J 7/102; B60J 7/141; B60J 7/106; F16B 2/185
USPC .................................................... 296/100.17
See application file for complete search history.

(56) References Cited

U.S. PATENT DOCUMENTS

| | | | |
|---|---|---|---|
| 3,178,139 | A | 4/1965 | McFarlin |
| 3,468,577 | A | 9/1969 | Mazerka |
| 4,846,431 | A | 7/1989 | Pflieger |
| 5,460,423 | A | 10/1995 | Kersting et al. |
| 5,462,249 | A | 10/1995 | Calzone |
| 5,540,475 | A | 7/1996 | Kersting et al. |

(Continued)

*Primary Examiner* — Joseph D. Pape
*Assistant Examiner* — Dana D Ivey
(74) *Attorney, Agent, or Firm* — Harness, Dickey & Pierce, P.L.C.

(57) ABSTRACT

A tonneau clamp including a link slidably coupled to tonneau cover; a clamping link pivotably coupled to the link and having a clamping surface; and a handle pivotably coupled to the link and the clamping link and moveable between lowered and upper positions. The handle can be pivotably coupled to the link at a first pivot joint and to the clamping link at a second pivot joint. Handle movement causes the clamping link to pivot relative to the link to raise the clamping surface from an unclamped position to a clamped position in which the clamping surface applies a clamping force against the underside of a ledge of a vehicle cargo box. In the unclamped position the first pivot joint is on a first side of a line and in the clamped position the first pivot joint is on a second side of the line opposite the first side.

22 Claims, 15 Drawing Sheets

(56) References Cited

U.S. PATENT DOCUMENTS

| | | |
|---|---|---|
| 5,655,808 A | 8/1997 | Wheatley |
| 6,543,835 B2 * | 4/2003 | Schmeichel ............ B60J 7/102 135/907 |
| 6,893,012 B2 | 5/2005 | Wong |
| 7,093,882 B2 | 8/2006 | Lake |
| 7,188,888 B2 | 3/2007 | Wheatley et al. |
| 7,258,387 B2 | 8/2007 | Weldy |
| 7,823,957 B2 | 11/2010 | Williamson |
| 8,085,481 B2 | 12/2011 | Hill |
| 8,511,736 B2 | 8/2013 | Williamson et al. |
| 8,807,625 B2 | 8/2014 | Garska |
| 8,960,764 B2 | 2/2015 | Spencer |
| 2005/0035249 A1 | 2/2005 | Busulto |
| 2008/0129077 A1 | 6/2008 | Weldy |
| 2010/0270824 A1 | 10/2010 | Yue |
| 2012/0274092 A1 | 11/2012 | Yue |
| 2014/0042754 A1 | 2/2014 | Spencer |
| 2015/0108306 A1 | 4/2015 | Chuang |
| 2015/0130212 A1 | 5/2015 | Spencer |

* cited by examiner

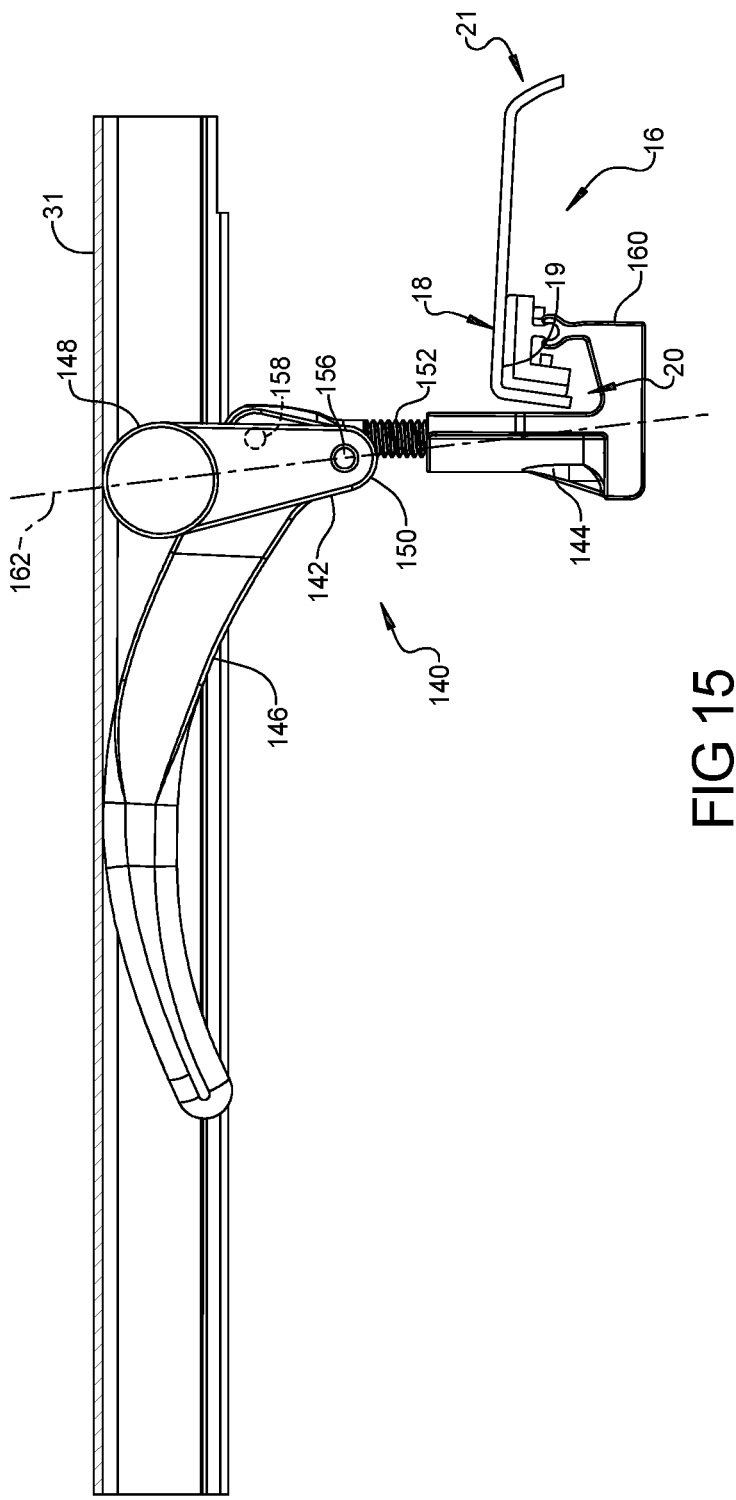

TONNEAU COVER SYSTEM AND MULTI-LINK AND/OR OVER-CENTER CLAMP

CROSS-REFERENCE TO RELATED APPLICATIONS

This application is a continuation-in part of U.S. patent application Ser. No. 14/875,911 filed on Oct. 6, 2015, which claims the benefit of U.S. Provisional Application No. 62/060,637, filed on Oct. 7, 2014. In addition, this application claims the benefit of U.S. Provisional Application No. 62/323,134, filed on Apr. 15, 2016. The entire disclosures of the above applications are incorporated herein by reference.

FIELD

The present disclosure relates to tonneau covers for vehicles. More particularly, the present disclosure relates to a clamp system for use in a tonneau cover system.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. Male snaps were then attached to the sides of the cargo box of the pickup truck via fasteners, while female snaps were attached along the edges of the cover. Unfortunately, these covers were sometimes difficult to handle and/or manufacture and occasionally failed to protect the cargo box.

More recently, foldable tonneau covers are often more desirable in that they conveniently cover the bed of the pickup truck for cargo protection. For access to the cargo bed, the foldable tonneau cover may be folded toward the passenger cabin (or other location).

By way of example, existing clamp systems generally employ a wing nut clamp arrangement, and/or spring biased clamp arrangement to fasten the tonneau cover in place relative to the pickup truck. The clamps typically hook onto the downwardly projecting (metal) flange of the truck bed. Such clamps, in the case of the cam lock arrangement, are adjustable by rotating a threaded cam pivot to permit attachment of the clamps to pickup trucks with differing length downwardly projecting flanges. The other clamping systems can use threaded portions or other telescoping type mechanisms to provide a length adjustment feature.

However, these clamping systems lead to various problems or failures when used with more recent pickup truck bed designs. For instance, many of the newer sidewall flanges of pickup truck beds can become deformed under the extreme load that can be exerted by clamping systems. In fact, several new vehicles being designed are contemplating changes to the flange material or reducing the flange thickness. The result might be a less structural flange which could be distorted when using typical tonneau clamp designs clamped to such downwardly extending flanges of the truck bed box. Consequently, as a conventional tonneau cover clamp is tightened in place, a user can exert sufficient force that causes the sidewall flange of the pickup truck bed to become permanently deformed.

Accordingly, there exists a need in the relevant art to provide a tonneau cover system capable of overcoming the disadvantages of the prior art. Additionally, there exists a need to provide sufficient retention capability to retain the tonneau cover on the pickup truck bed without causing permanent deformation.

SUMMARY

This section provides a general summary of the disclosure, and is not a comprehensive disclosure of its full scope or all of its features.

According to an aspect of the present disclosure, a tonneau cover system is provided for a cargo box of a pickup truck. The cargo box can include a ledge having an underside and a flange extending downwardly from the ledge. The tonneau cover system can include a tonneau cover and a clamp. The tonneau cover can be configured to cover the cargo box. The clamp can be configured to secure the tonneau cover to the cargo box. The clamp can comprise a first link, a clamping link, and a handle member. The first link can be slidably coupled to the tonneau cover. The clamping link can have a first end and a clamping surface remote from the first end. The clamping link can be pivotably coupled to the first link. The handle member can be pivotably coupled to the first link and the clamping link. The handle member can be moveable between a lowered position and an upper position. Movement of the handle member can cause the clamping link to pivot relative to the first link to raise the clamping surface from an unclamped position to a clamped position. In the clamped position, the clamping surface can be positionable to apply a clamping force against the underside of the ledge of the cargo box.

According to another aspect of the present disclosure, a tonneau cover clamp is provided for clamping a tonneau cover to a cargo box of a pickup truck. The cargo box can include a ledge having an underside and a flange extending downwardly from the ledge. The tonneau cover system a tonneau cover and a clamp. The tonneau cover can be configured to cover the cargo box. The clamp can be configured to secure the tonneau cover to the cargo box. The clamp can comprise a first link, a clamping link, and a handle member. The first link can have a first coupling and a second coupling that are slidably coupled to the tonneau cover. The clamping link can have a first end and a clamping surface remote from the first end. The clamping link can be pivotably coupled to the first link. The handle member can include a first pivot link. The first pivot link can be pivotably coupled to the handle member at a first pivot joint and to the first link at a second coupling. A second pivot joint can pivotably couple the handle member to the clamping link. The handle member can be moveable between a lowered position and an upper position. Movement of the handle member from the lowered position to the upper position can cause the clamping link to pivot relative to the first link to raise the clamping surface from an unclamped position to a clamped position without lateral movement of the clamping link towards the first link. In the clamped position, the clamping surface can be positionable to apply a clamping force against the underside of the ledge of the cargo box.

According to another aspect of the present disclosure, a tonneau cover system is provided for clamping a tonneau cover to a cargo box of a pickup truck. The cargo box can include a ledge having an underside and a flange extending downwardly from the ledge. The tonneau cover system includes a tonneau cover and a clamp. The tonneau cover can be configured to cover the cargo box. The clamp can be configured to secure the tonneau cover to the cargo box. The clamp can comprise a first link, a clamping link, and a handle member. The first link can be slidably coupled to the tonneau cover. The handle member can be pivotably coupled to the first link at a first pivot joint. The clamping link can have a first end and a clamping surface remote from the first end. The first end of the clamping link can be pivotably coupled to the handle member. The handle member can be moved between a lowered position and an upper position. Movement of the handle member from the lowered position to the upper position can cause the clamping link to pivot relative to the first link to raise the clamping surface from an unclamped position to a clamped position without lateral movement of the clamping link towards the first link. In the clamped position, the clamping surface can be positionable to apply a force against the underside of the ledge of the cargo box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is a side plan view of the exemplary tonneau clamp of FIG. 13 in a clamped position.

Corresponding reference numerals indicate corresponding parts throughout the several views of the drawings.

DETAILED DESCRIPTION

Example embodiments will now be described more fully with reference to the accompanying drawings.

FIGS. 1-9 illustrate one exemplary tonneau cover system 10 for covering a truck bed or a cargo box 11. The tonneau cover system 10 comprises a tonneau cover 14 and a clamp 34.

Figure 1:
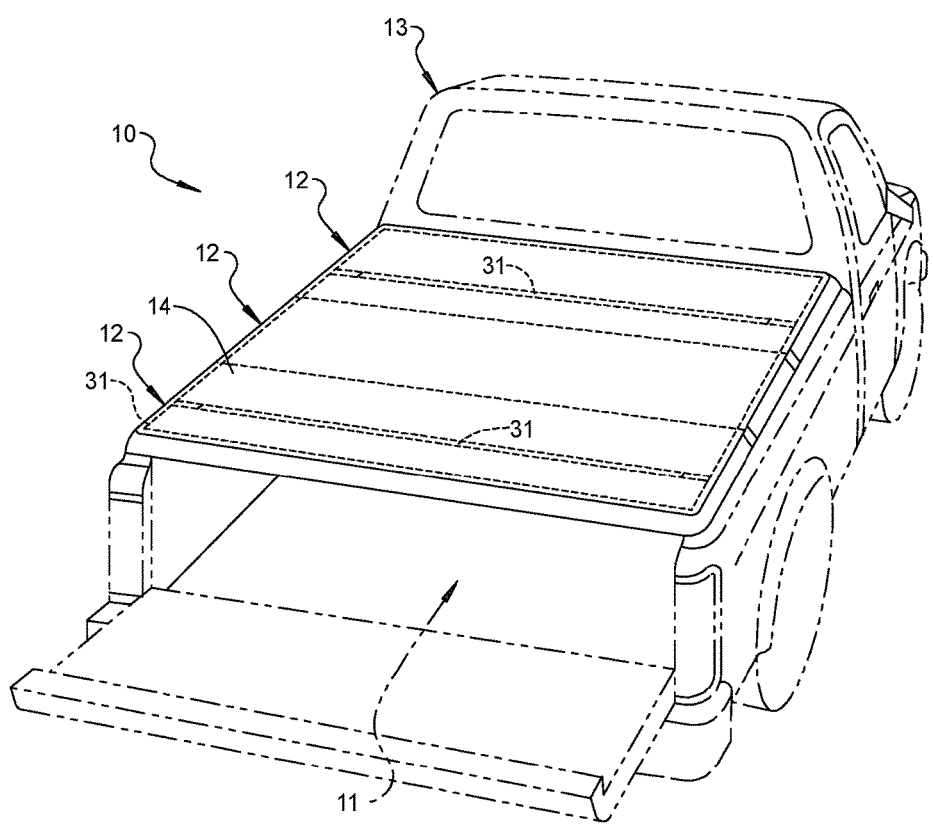
FIG. 1 is a perspective view of a tonneau cover system covering a cargo box and utilizing one of the exemplary clamps in accordance with the present disclosure.
Figure 4:
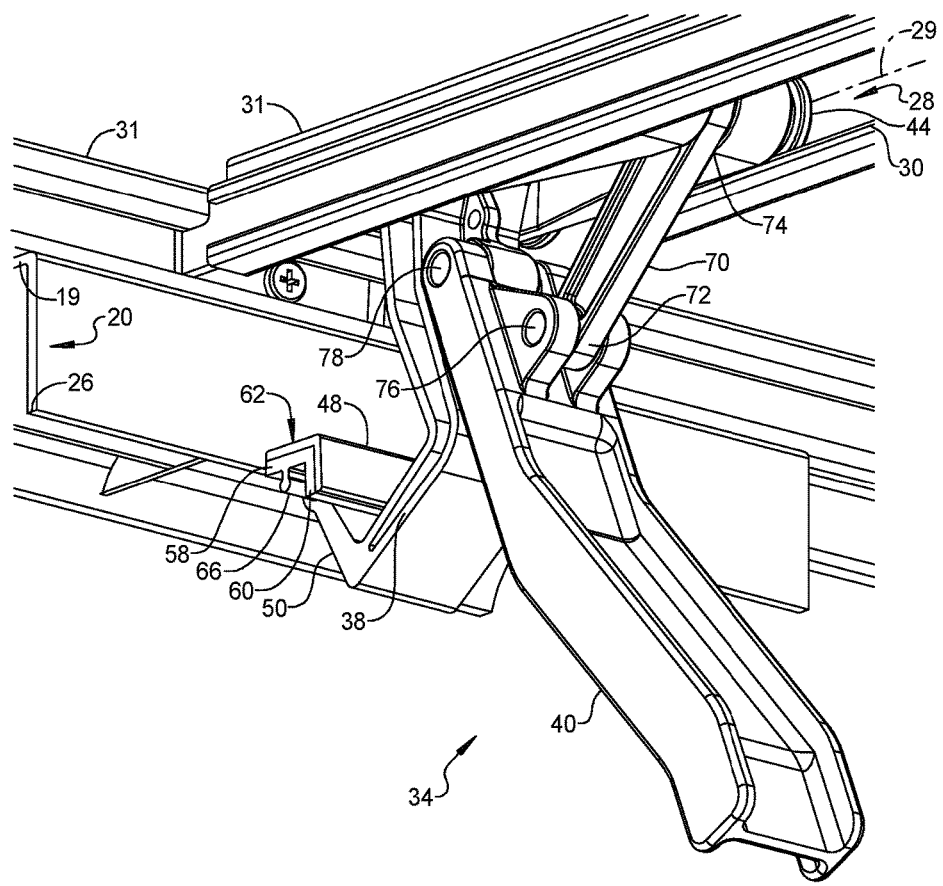
FIG. 4 is a partial prospective view of the exemplary tonneau cover system of FIG. 1, wherein the exemplary tonneau clamp is in an unclamped position.
Figure 5:
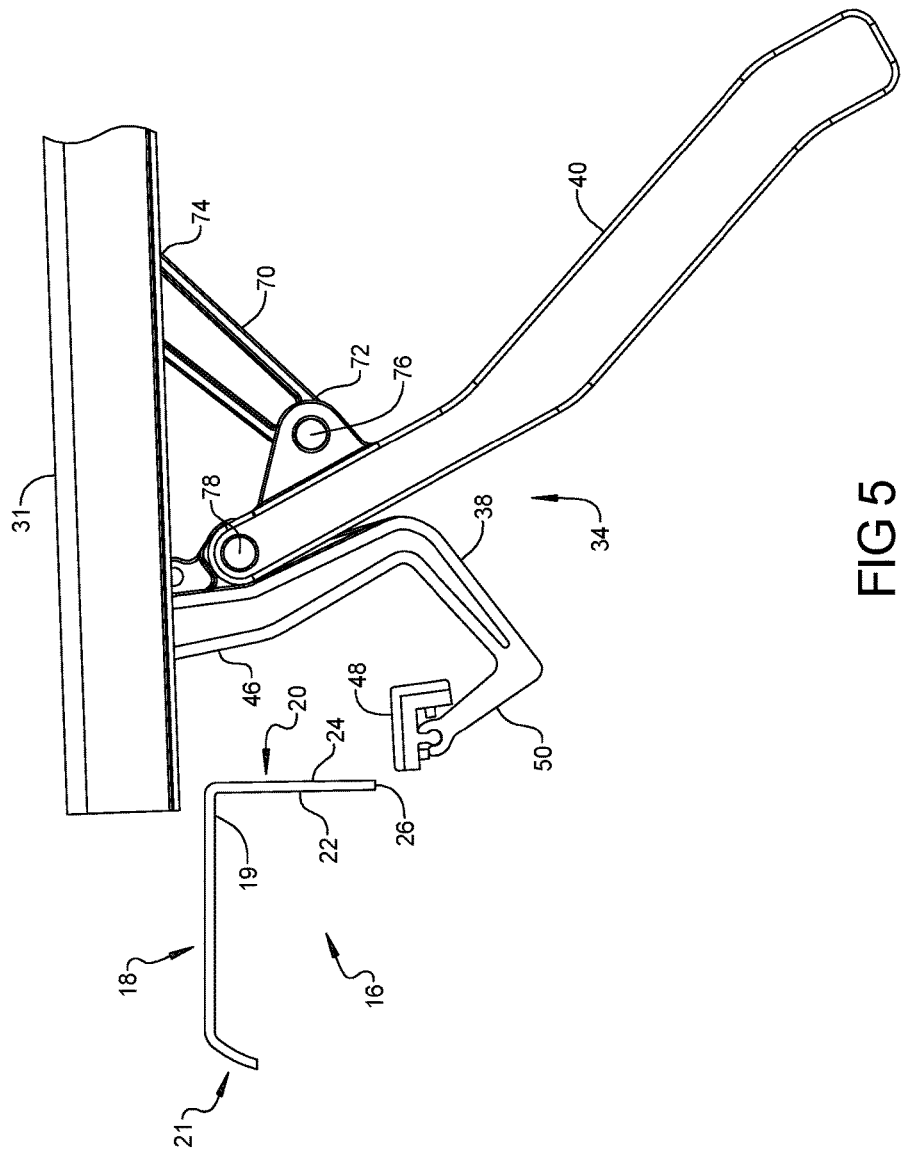
FIG. 5 is a side plan view of the exemplary tonneau cover system of FIG. 1, wherein the exemplary tonneau clamp is in an unclamped position.
Figure 6:
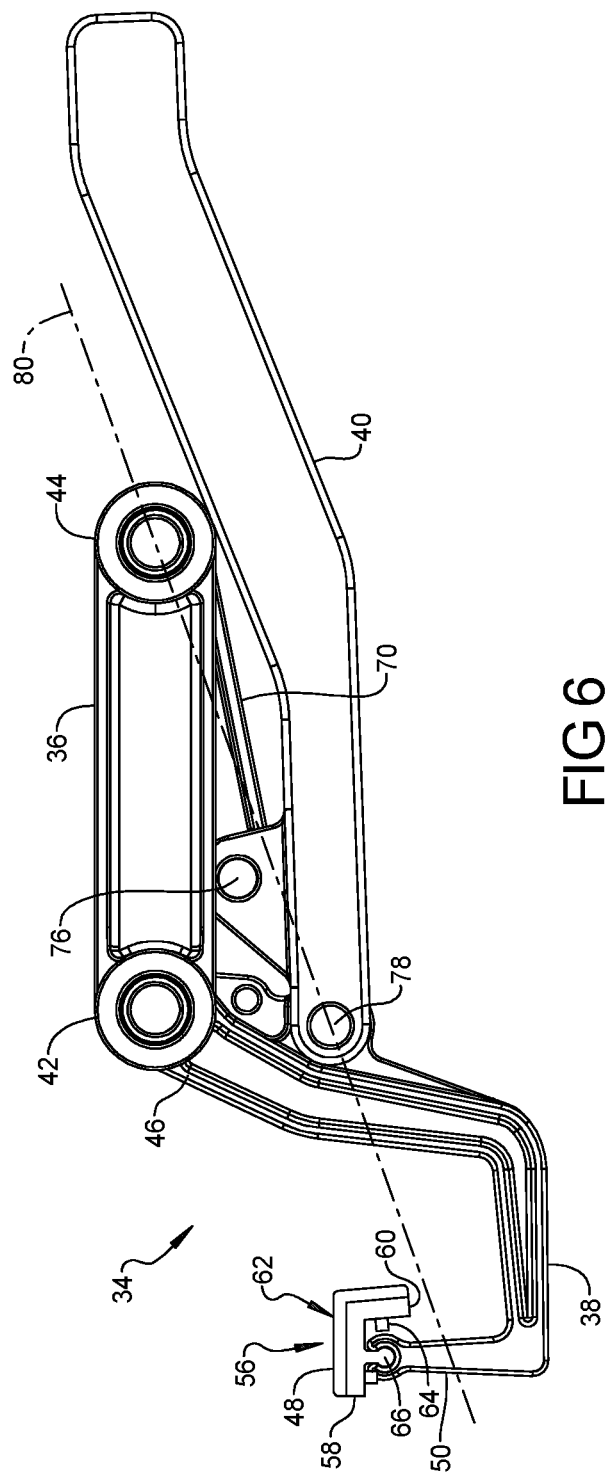
FIG. 6 is a side plan view of the exemplary tonneau clamp of FIG. 2 in a clamped position.
Figure 7:
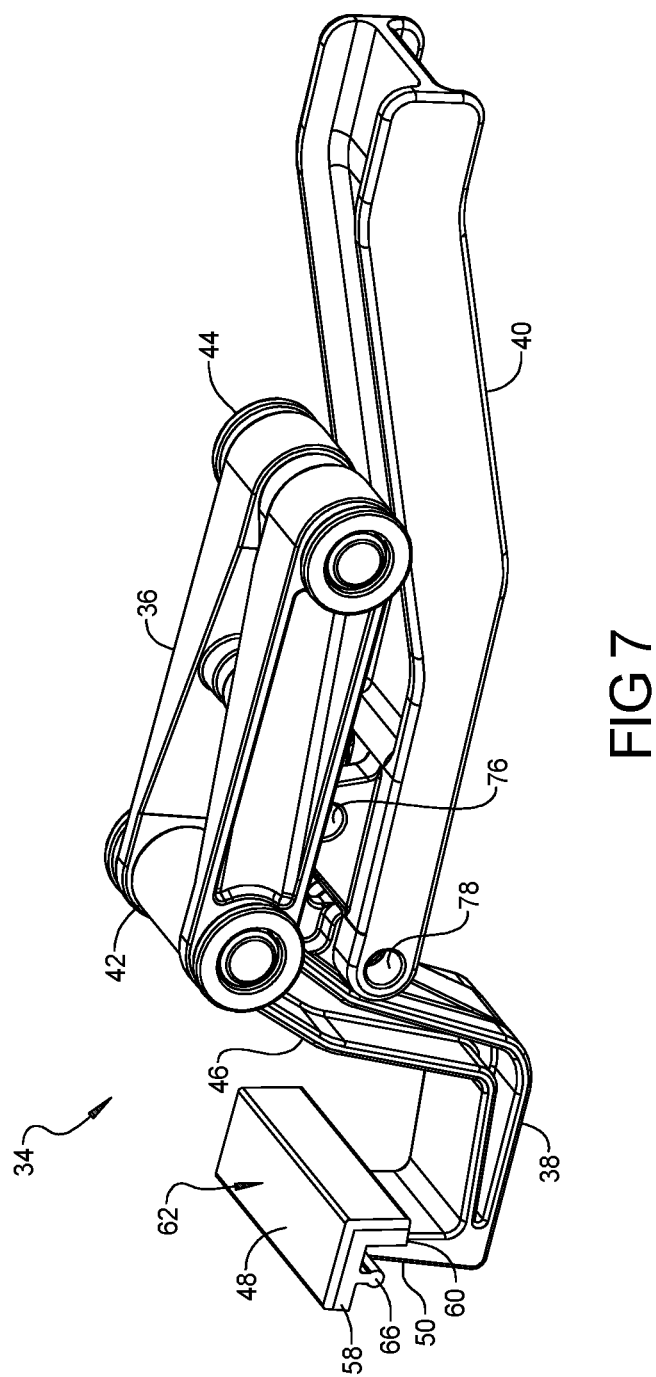
FIG. 7 is a partial top-down prospective view of the exemplary tonneau clamp of FIG. 2 in an clamped position.
Figure 8:
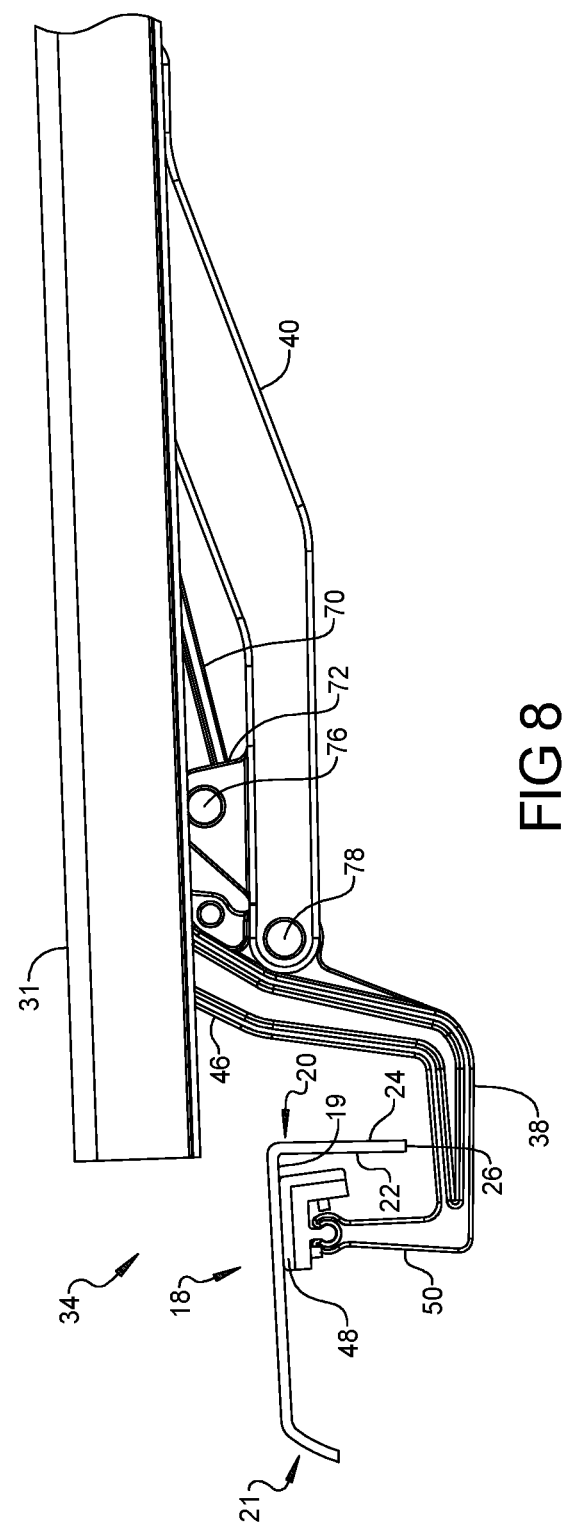
FIG. 8 is a side plan view of the exemplary tonneau cover system of FIG. 1, wherein the exemplary tonneau clamp is in a clamped position.
Figure 9:
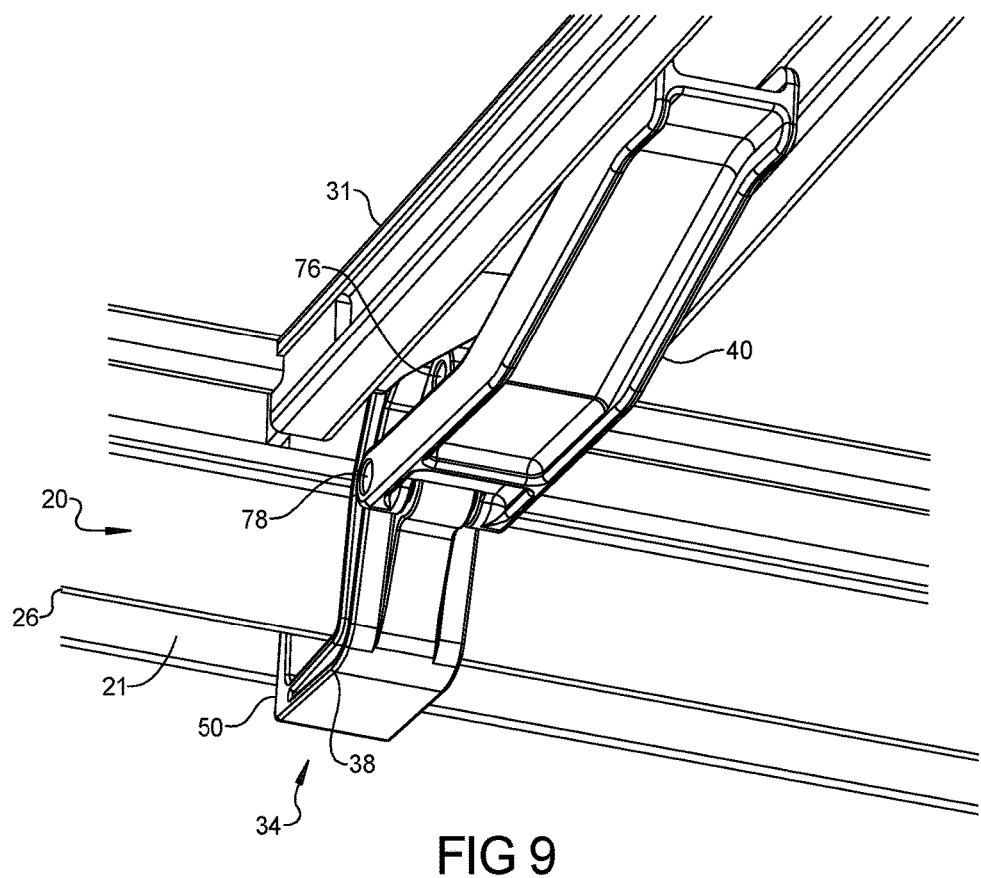
FIG. 9 is a partial prospective view of the exemplary tonneau cover system of FIG. 1, wherein the exemplary tonneau clamp is in a clamped position.

As seen in FIG. 1, in some instances, the truck bed or cargo box 11 can be part of a pickup truck 13. As shown in FIGS. 4, 5, and 6, the cargo box 11 can comprise a sidewall 16 including a ledge 18 having an underside and/or interior surface 19, a flange 20 extending downwardly from the ledge 18, and an outboard wall 21 extending downwardly from the ledge 18. The ledge 18 can laterally extend from the outboard wall 21, and the flange 20 can be spaced inboard from the outboard wall 21. The flange 20 can include an outboard face or side 22 facing the sidewall 16, an inboard face or side 24 opposite the outboard side 22, and a bottom side or edge 26 facing downward.

In some instances, the tonneau cover 14 can include a plurality of sections 12 foldable between a deployed arrangement covering the cargo box 11 and a folded arrangement wherein the sections 12 are stacked, allowing access to the cargo box 11. In some instances, each section 12 of the tonneau cover 14 can comprise a plurality of frame and/or bow members 31 that together may form a rectangular frame supporting a fabric, textile, or other flexible sheet material spanning the frame 31. In some instances, the tonneau cover 14 may include sections formed of rigid panels that are hinged to allow the sections to be folded into a stack. Other tonneau cover 14 configurations are, of course, possible.

In some instances, the bow members 31 of the tonneau cover system 10 can comprise an extruded metal rail having a C-shaped cross-section defining a longitudinal internal channel 28 with a longitudinally extending central opening 30. The channel 28 and opening 30 can extend longitudinally along the length of the frame member 31 across the cargo box 11. The frame members 31 can define a central or main longitudinal axis 29 thereof.

The clamp 34 includes a first link 36, a clamping link 38, and a handle member 40, which move relative to one another between an unlocked, unclamped, or unlatched position and a locked, clamped, or latched position.

The first link 36 can be slidably coupled to the tonneau cover 14 (FIGS. 4-5 and 8-9). The first link 36 can comprise a first coupling 42 and a second coupling 44. The first coupling 42 and the second coupling 44 can be slidably coupled to the tonneau cover 14. In some instances, the first coupling 42 and the second coupling 44 may comprise barrel members captured within the channel 28. Barrels can be integrally formed with both or either of the first coupling 42 and the second coupling 44. Each barrel can be generally cylindrical in shape. Each barrel can slide along the longitudinal axis of the channel 28.

While in the unclamped position, the first coupling 42 and the second coupling 44 of the first link 36 can be slid within the channel 28 to move the clamp 34 axially along the frame member 31 (e.g., inboard or outboard). With the handle member 40 in an unclamped position, the clamping end or surface 48 of the clamp 34 can clear the flange 20 and align with an interior surface 19 of the ledge 18.

The clamping link 38 can comprise a first or proximal portion, end, or section 46 pivotably coupled to the first link 36 and a clamping or distal surface, portion, or end 48 remote from the first end 46. In some instances, the first end 46 of the clamping link 38 can be pivotably coupled to the first coupling 42 of the first link 36.

The clamping surface 48 of the clamping link 38 can include a portion 50 extending upwardly at an angle relative to the first end 46 of the clamping link 38 and towards the tonneau cover 14. The first end 46 of the clamping link 38 can define a first main, central, or longitudinal axis 52. The upwardly extending portion 50 can generally define a second main, central, or longitudinal axis 54. The first longitudinal axis 52 and the second longitudinal axis 54 can define the upwardly extending portion 50 therebetween. The upwardly extending portion 50 can be less than or equal to 90°, such that the first end 46 of the clamping link 38 and the clamping surface 48 of the clamping link 38 can generally form an "L" shape, a "U" shape, or "V" shaped valley, recess, channel, or space therebetween. The upwardly extending portion 50 can align the clamping surface 48 with the interior surface 19 of the ledge 18.

In some instances, the flexible member 62 can provide a V shaped clamping surface 48 with a rectangular longitudinally (generally vertically) extending portion and a rectangular laterally (generally horizontally) extending portion. The dimensions of the clamping surface 48 are large enough to eliminate or minimize permanent deformation of the ledge 18 and the flange 20 under the loads transmitted by the clamp 34 from the tonneau cover 14 to the ledge 18 and the flange 20 during normal vehicle operation.

In some instances, the clamping surface 48 comprises a distal member or platform having a first rigid portion 58; a second rigid portion 60 extending perpendicularly from the first rigid portion 58; and an elastic, resilient, or flexible member 62 that can cover a first surface of the first rigid portion 58 and the second rigid portion 60. In other instances, the elastic member 62 can cover one of the first surface of the first rigid portion 58 or the first surface of the second rigid portion 60. Retention members 64 can extend through the first rigid portion 58 and the second rigid portion 60 to couple the elastic member 62 to the rigid portions 58, 60. In some instances, the platform 56 can be molded directly to the clamping link 38. In other instances, the platform 56 can be molded to have a coupling or cylinder member 66 having a shape corresponding to a groove 68 of the clamping link 38 allowing the platform 56 to pivot.

The handle member 40 can be pivotably coupled to the first link 36 and the clamping link 38 and movable between a first, lowered, and/or unclamped position and a second, upper, and/or clamped position. The handle member 40 can be pivotably coupled to the second coupling 44 of the first link 36. In some instances, a first pivot link or bar 70 can connect the handle member 40 and the first link 36. The first pivot bar 70 can have a first end 72 pivotably coupled to the handle member at a first pivot joint 76 and a second end 74 pivotably coupled to the second coupling 44 of the first link 36. A second pivot joint 78 can pivotably couple the handle member 40 and the clamping link 38.

Movement of the handle member 40 causes the clamping link 38 to pivot relative to the first link 36 to raise the clamping surface from an unclamped and/or lowered positioned (FIGS. 2-5) to a clamped and/or upper position (FIGS. 6-9). Movement of the handle member 40 causes the clamping link 38 to move from the unclamped position to the clamping position without movement of the clamping link 38 laterally towards the first link 36. In this case, for example, the clamping link 38 moves laterally away from the first link 36.

Figure 2:
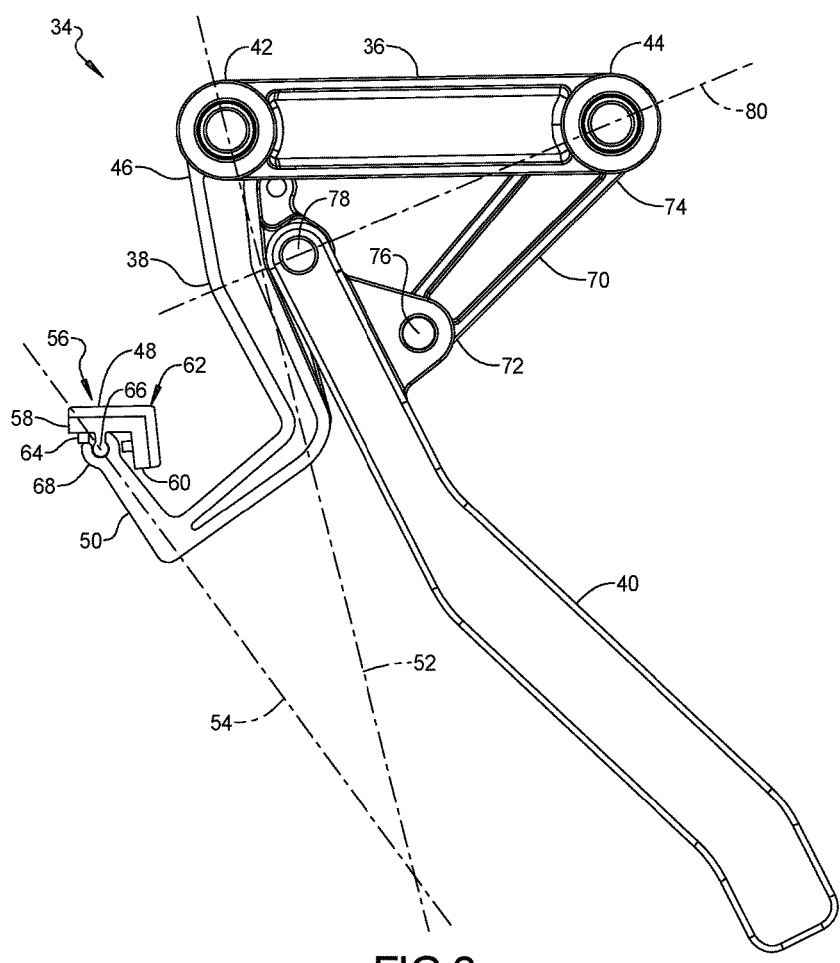
FIG. 2 is a side plan view of one of the exemplary embodiments of a tonneau clamp in accordance with the present disclosure in an unclamped position.
Figure 3:
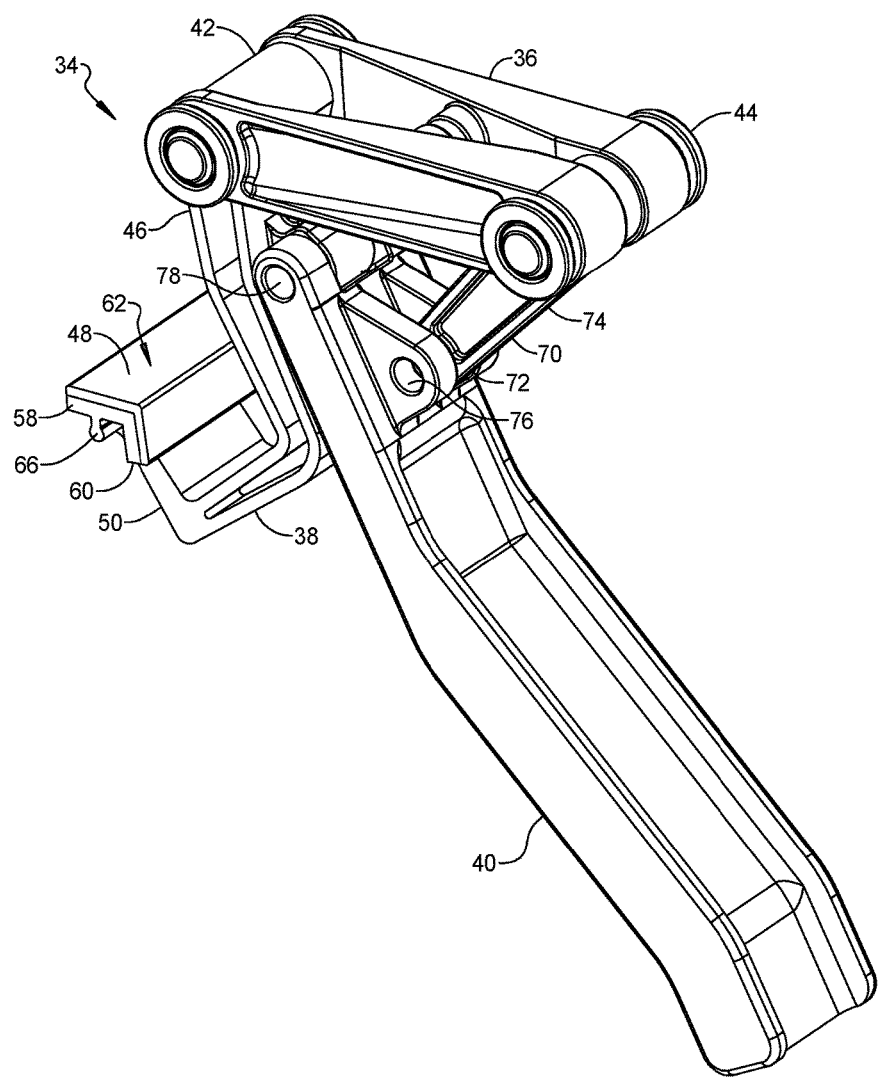
FIG. 3 is a partial top-down prospective view of the exemplary tonneau clamp of FIG. 2 in an unclamped position.

As seen in FIG. 2, in the unclamped position the first pivot joint 76 is on a first side of a line 80 extending between the second pivot joint 78 and the second coupling 44 of the first link 36. As seen in FIG. 6, in the clamped position the first pivot joint 76 is on a second side opposite the first side of the line 80 in an over-center position. In the clamped position, the first link 36 and at least a portion of the handle member 40 each extend longitudinally in a direction that is substantially parallel with each other.

In the clamped position, the clamping surface 48 of the clamping link 38 can engage the interior surface 19 of the ledge 18 and apply a clamping force thereto. In some instances, the underside or interior surface 19 of the ledge 18 has a first contacting portion and the clamping surface 48 of the clamping link 38 provides a second contacting portion that opposes the first contacting portion when the clamp 34 is in the clamped position. The interior surface 19 of the ledge 18 and the clamping surface 48 of the clamping link 38 are positioned to apply the clamping force to the cargo box throughout an area defined by an overlap of the opposing first and second contacting portions. The area can have dimensions large enough to avoid permanent deformation of the cargo box under loads transmitted by the clamp 34 to the cargo box 11. In some instances, the clamping link 38 does not contact or does not apply a force to the downwardly extending flange 20. The clamping surface 48 does not apply a force sufficient to permanently deform the cargo box 11.

Figure 10:
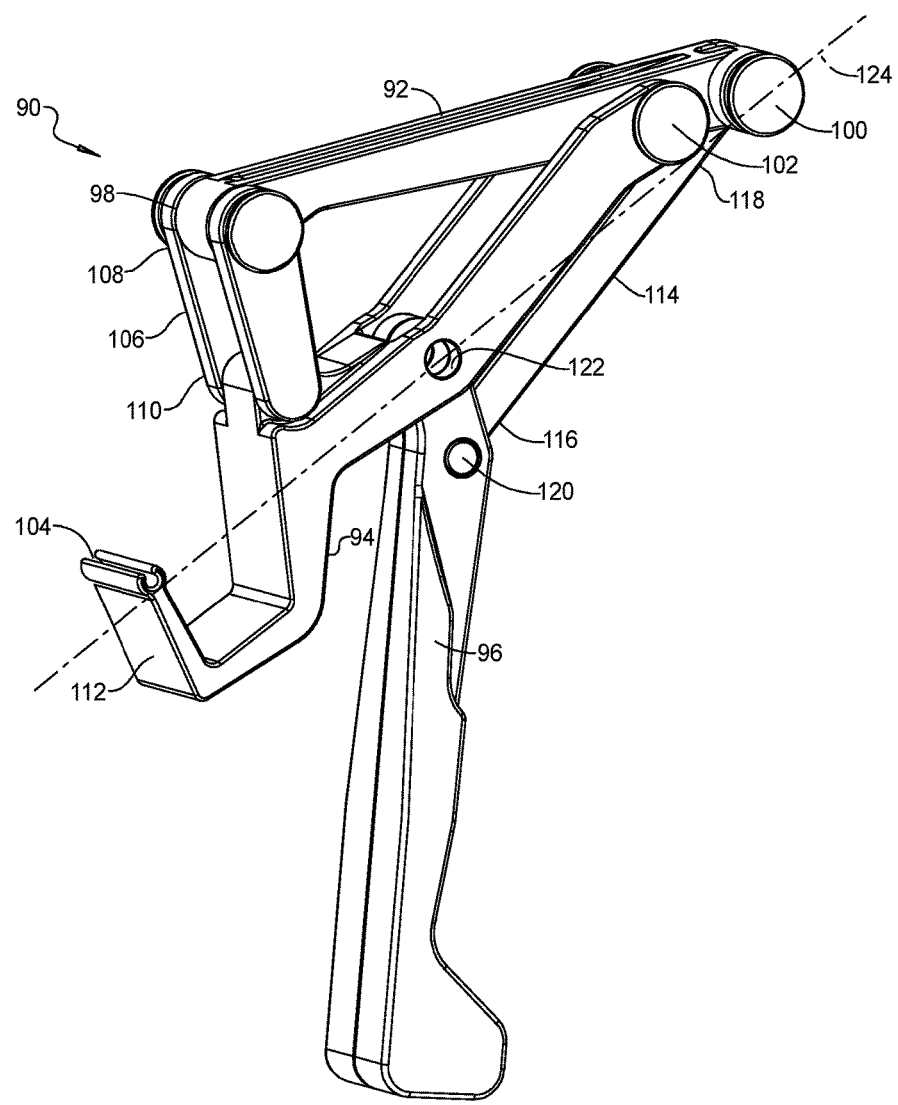
FIG. 10 is a partial prospective view of an exemplary tonneau clamp in an unclamped position.
Figure 11:
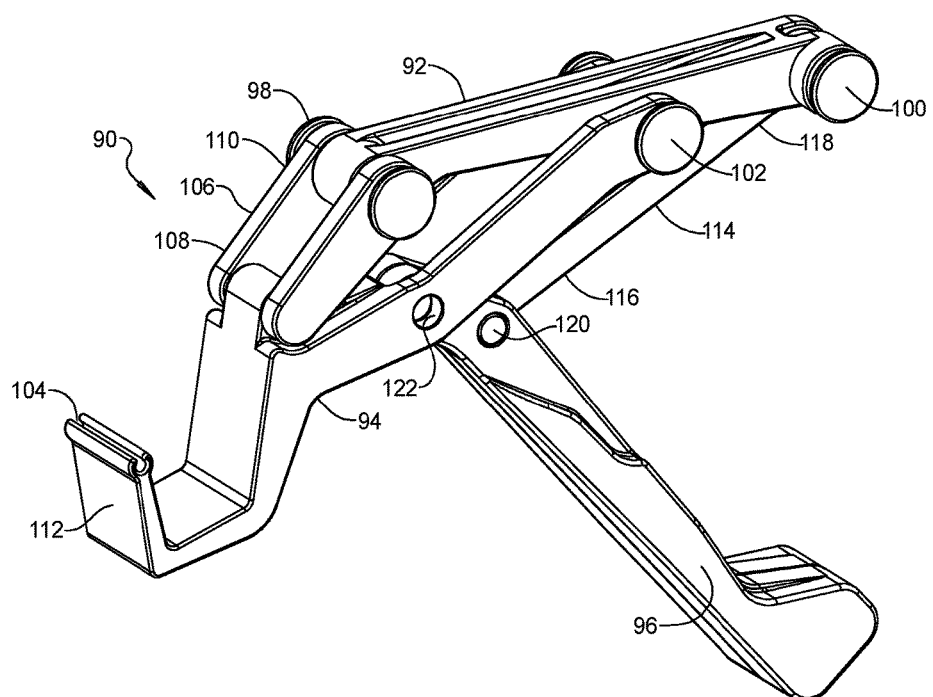
FIG. 11 is a partial prospective view of the exemplary tonneau clamp of FIG. 10 in an intermediate position between the unclamped position and the clamped position.
Figure 12:
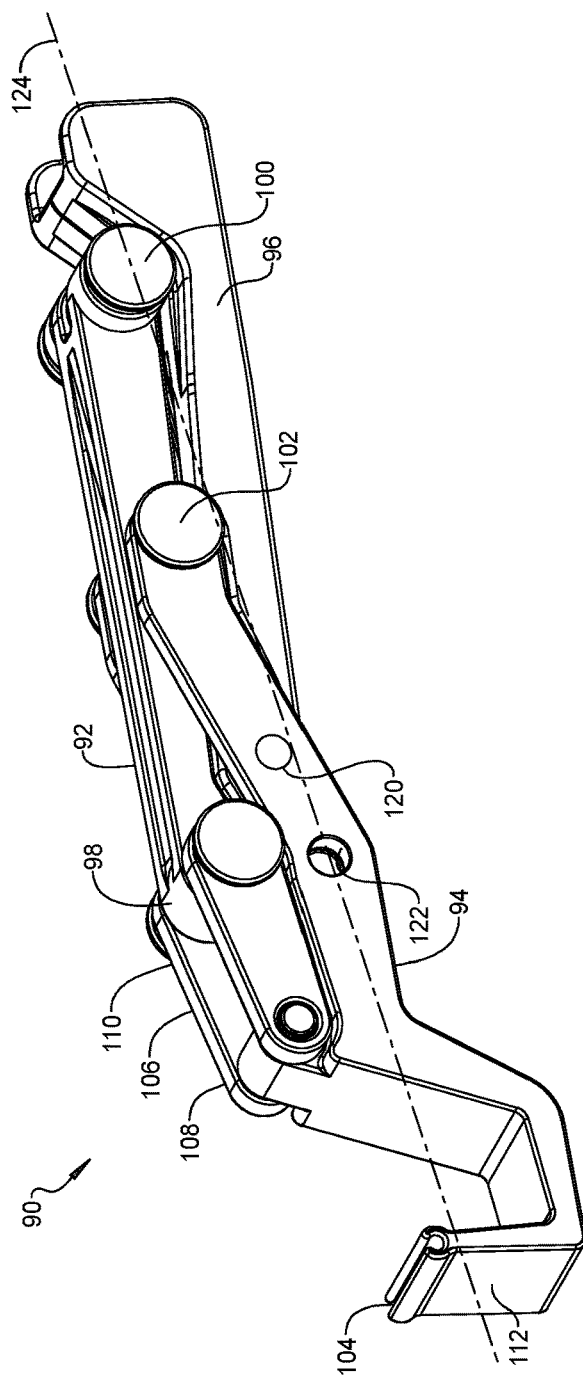
FIG. 12 is a partial prospective view of the exemplary tonneau clamp of FIG. 10 in a clamped position.

FIGS. 10-12 illustrate another exemplary tonneau clamp 90. The above descriptions of the cargo box 11 and the tonneau cover 14 are similarly applicable in this instance.

The clamp 90 comprises a first link 92, a clamping link 94, and a handle member 96, which move relative to one another between an unlocked, unclamped, or unlatched position and a locked, clamped, or latched position.

The first link 92 can comprise a first coupling 98 and a second coupling 100. The first coupling 98 and the second coupling 100 can be slidably coupled to the tonneau cover 14. Similar to the discussion above, in some instances, the first coupling 42 and the second coupling 44 may comprise barrel members captured within and slidable along the channel 28.

While in the unclamped position, the first coupling 98 and the second coupling 100 of the first link 92 can be slid within the channel 28 to move the clamp 90 axially along the frame member 31 (e.g., inboard or outboard) and can clear the flange 20 and align with an underside or interior surface 19 of the ledge 18.

The clamping link 94 comprises a first or proximal portion, end, or section 102 and a clamping end 104 that is remote from the first end 102. The clamping link 94 and is pivotably coupled to the first link 92. In some instances, a second pivot link or bar 106 can connect the clamping link 94 and the first link 92. The second pivot bar 106 can have a first end 108 pivotably coupled to the first coupling 98 of the first link 92 and a second end 110 pivotably coupled to the clamping link 94 at an intermediate point between the first end 102 and the clamping end 104. The first end 102 of the clamping link 94 can be coupled to the first link 92 at an intermediate point between the first coupling 98 and the second coupling 100 of the first link 92.

The above description of the upwardly extending portion 50 of the clamping link 38 with reference to the first exemplary embodiment is similarly applicable in this instance. In general, a clamping platform 56 such as illustrated in FIGS. 2-7 can be pivotably coupled to the clamping end 104 as previously described. Also as previously described, the clamping link 94 can include a portion 112 extending upwardly at an angle relative to the first end 102 of the clamping link 94 and towards the tonneau cover 14. The upwardly extending portion 112 can align the clamping surface 104 with the interior surface 19 of the ledge 18.

The handle member 96 can be pivotably coupled to the first link 92 and the clamping link 94 and movable between a first, lowered, or unclamped position and a second, upper, or clamped position. The handle member 96 can be pivotably coupled to the second coupling 100 of the first link 92. In some instances, a first pivot link or bar 114 can connect the handle member 96 and the first link 92. The first pivot bar 114 can have a first end 116 pivotably coupled to the handle member 96 at a first pivot joint 120 and a second end 118 pivotably coupled to the second coupling 100 of the first link 92. A second pivot joint 122 can pivotably couple the handle member 96 to an intermediate point of the clamping link 94.

Movement of the handle member 96 causes the clamping link 94 to pivot relative to the first link 92 to raise the clamping surface from an unclamped and/or lowered positioned (FIG. 10) to a clamped and/or upper position (FIG. 12). Movement of the handle member 96 causes the clamping link 94 to move from the unclamped position to the clamping position without movement of the clamping link 94 laterally towards the first link 92. In this case, for example, the clamping link 94 moves laterally away from the first link 92.

As seen in FIG. 10, in the unclamped position the first pivot joint 120 is on a first side of a line 124 extending between the second pivot joint 122 and the second coupling 100 of the first link 92. As seen in FIG. 12, in the clamped position the first pivot joint 120 is on a second side opposite the first side of the line 124 in an over-center position. In the clamped position the first link 92 and at least a portion of the handle member 96 each extend longitudinally in a direction that is substantially parallel with each other.

Figure 13:
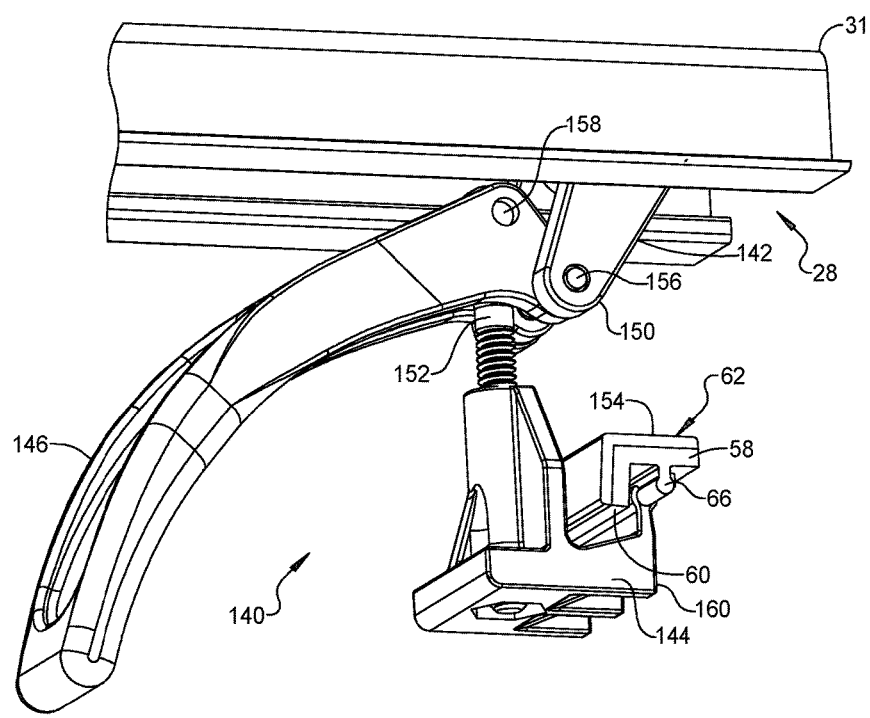
FIG. 13 is a partial prospective view of an exemplary tonneau clamp in an unclamped position.
Figure 14:
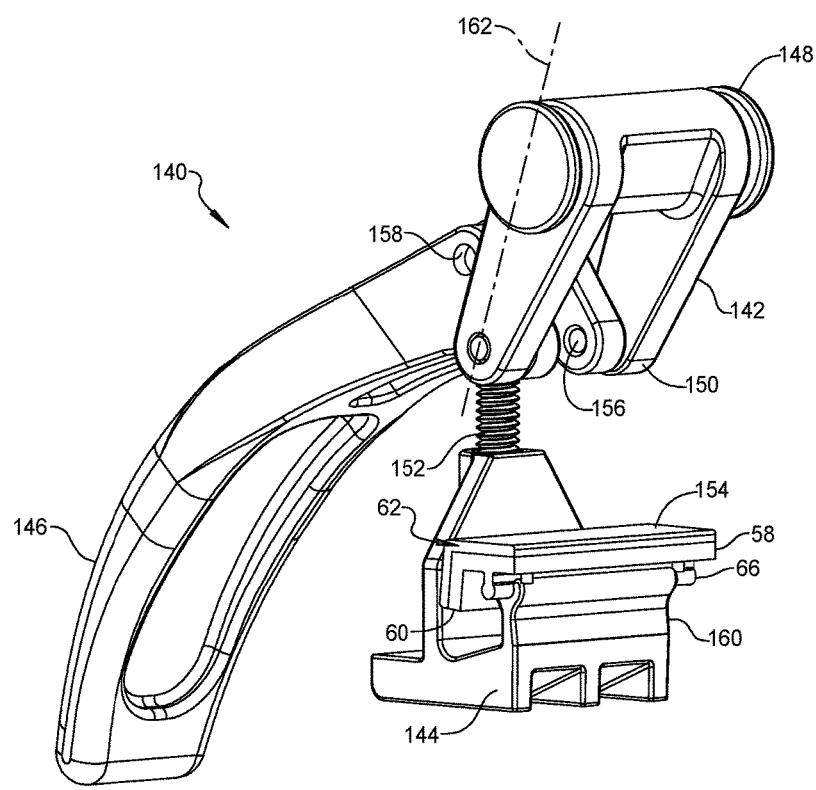
FIG. 14 is a partial prospective view of the exemplary tonneau clamp of FIG. 13 in an unclamped position.

FIGS. 13-15 illustrate another exemplary tonneau clamp 140. The above descriptions of the cargo box 11 and the tonneau cover 14 are similarly applicable in this instance.

The clamp 140 comprises a first link 142, a clamping link 144, and a handle member 146, coupled together and movable relative to one another between an unlocked, unclamped, or unlatched position (FIG. 13) and a locked, clamped, or latched position (FIG. 15).

The first link 142 can be slidably coupled to the tonneau cover 14. The first link 142 can comprise a first or proximal coupling 148 and a second or distal coupling 150. The first coupling 148 of the first link 142 can be slidably coupled to the tonneau cover 14. While in the unclamped position, the first coupling 148 of the first link 92 can be slid within the channel 28 to move the clamp 140 axially along the frame member 31 (e.g., inboard or outboard). The clamp 140 can clear the flange 20 and align with an interior surface 19 of the ledge 18. The second coupling 150 of the first link 142 can pivotably couple to the handle member 146 via a first pivot joint or pin 156.

The clamping link 144 comprises a first or proximal portion, end, or section 152 and a clamping surface 154 remote from the first end 152 and is pivotably coupled to the first link 142. The first end 152 of the clamping link 144 can be pivotably coupled to the handle member 146 via a second pivot pin or joint 158.

The above description of the upwardly extending portion 50 of the clamping link 38 with reference to the first exemplary embodiment is similarly applicable in this instance. In general, the clamping surface 154 of the clamping link 144 can include a portion 160 extending upwardly at an angle relative to the first end 152 of the clamping link 144 and towards the tonneau cover 14. The upwardly extending portion 160 can align the clamping surface 154 with the interior surface 19 of the ledge 18.

Movement of the handle member 146 causes the clamping link 144 to pivot relative to the first link 142 to raise the clamping surface 154 from an unclamped and/or lowered positioned (FIGS. 13 & 14) to a clamped and/or upper position (FIG. 15). Movement of the handle member 146 causes the clamping link 144 to move from the unclamped position to the clamping position without movement of the clamping link 144 laterally towards the first link 142.

As seen in FIG. 14, in the unclamped position the second pivot joint 158 is on a first side of a line 162 extending between the first pivot joint 156 and the first coupling 148 of the first link 142. As seen in FIG. 15, in the clamped position the second pivot joint 158 is on a second side opposite the first side of the line 162 in an over-center position. In the clamped position, at least a portion of the handle member 146 and the bow member 31 to which it is attached each extend longitudinally in a direction that is substantially parallel with each other.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a sidewall including a ledge having an underside and a flange extending downwardly from the ledge, the tonneau cover system comprising:
   a tonneau cover positioned over the cargo box; and
   a clamp coupled to the tonneau cover to secure the tonneau cover to the cargo box, the clamp comprising:
   a first link slidably coupled to the tonneau cover;
   a clamping link pivotably coupled to the first link and having a first end and a clamping surface remote from the first end; and
   a handle member pivotably coupled to the first link and the clamping link and moveable between a lowered position and an upper position, wherein movement of the handle member causes the clamping link to pivot relative to the first link to raise the clamping surface from an unclamped position to a clamped position;
   wherein in the clamping position the clamping surface is positionable to apply a clamping force against the underside of the ledge of the cargo box.

2. The tonneau cover system according to claim 1, wherein movement of the handle member causes the clamping link to move from the unclamped position to the clamping position without moving the clamping link laterally towards the first link.

3. The tonneau cover system according to claim 1, wherein the tonneau cover comprises a frame overlying a portion of the ledge of the sidewall, and wherein when in the clamped position, the portion of the ledge is sandwiched between the clamping surface of the clamping link frame to apply the clamping force to the portion of the ledge of the cargo box.

4. The tonneau cover system according to claim 1, wherein the clamping surface of the clamping link further comprises:
   an angle portion extending at an angle relative to the first end of the clamping link and towards the tonneau cover, whereby the clamping surface is positionable to align with the underside of the ledge.

5. The tonneau cover system according to claim 1, wherein the clamping surface further comprises:
   a platform including a first rigid portion, a second rigid portion extending horizontally from the first rigid portion, an elastic member that covers a first surface of the first and second rigid portions, and a coupling member formed on a second surface opposing the first surface of the first and second rigid portions; and
   a groove adapted to receive the coupling member and to secure the platform.

6. The tonneau cover system according to claim 1, wherein
   the first link further comprises a first coupling and a second coupling, wherein the first coupling and the second coupling are slidably coupled to the tonneau cover;
   the clamping link is pivotably coupled to at least the first coupling of the first link;
   the handle member further comprises a first pivot link pivotably coupled to the handle member at a first pivot joint and to the first link at the second coupling, and a second pivot joint pivotably coupling the handle member to the clamping link;
   in the unclamped position the first pivot joint is on a first side of a line extending between the second pivot joint and the second coupling of the first link; and
   in the clamped position the first pivot joint is on a second side opposite the first side of the line in an over-center position.

7. The tonneau cover system according to claim 6, wherein the first end of the clamping link is directly coupled to the first coupling of the first link.

8. The tonneau cover system according to claim 6, further comprising:
   a second pivot link having a first coupling and a second coupling, wherein the first coupling of the second pivot link is pivotably coupled to the first coupling of the first link and the second coupling of the second pivot link is pivotably coupled to the clamping link.

9. The tonneau cover system according to claim 6, wherein the first end of the clamping link is coupled to the first link.

10. The tonneau cover system according to claim 6, wherein the first end of the clamping link is pivotably coupled to the first coupling of the first link.

11. The tonneau cover system according to claim 6, wherein the first link and at least a portion of the handle member each extend longitudinally in a direction that is substantially parallel with each other when the tonneau cover system is in the clamped position.

12. The tonneau cover system according to claim 1, wherein
   the first link further comprises a first coupling and a second coupling, wherein the first coupling is slidably coupled to the tonneau cover;
   the handle member is pivotably coupled to the second coupling of the first link at a first pivot joint;

the first end of the clamping link is pivotably coupled to the handle member at a second pivot joint;

in the unclamped position the second pivot joint is on a first side of a line extending between the first pivot joint and the first coupling of the first link; and in the clamped position the second pivot joint is on a second side opposite the first side of the line in an over-center position.

13. The tonneau cover system of claim 12, wherein the first link and at least a portion of the handle member each extend longitudinally in a direction that is substantially parallel with each other when in the clamped position.

14. A tonneau cover system for a cargo box of a pickup truck, the cargo box comprising a sidewall including a ledge having an underside and a flange extending downwardly from the ledge, the tonneau cover system comprising:

a tonneau cover positioned over the cargo box; and a clamp coupled to the tonneau cover to secure the tonneau cover to the cargo box, the clamp comprising:

a first link having a first coupling and a second coupling, wherein the first coupling and the second coupling are slidably coupled to the tonneau cover;

a clamping link pivotably coupled to the first link and having a first end and a clamping surface remote from the first end; and a handle member, a first pivot link pivotably coupled to the handle member at a first pivot joint and to the first link at the second coupling, and a second pivot joint pivotably coupling the handle member to the clamping link;

wherein the handle member is movable between a lowered position and an upper position, movement of the handle member from the lowered position to the upper position causes the clamping link to pivot relative to the first link to raise the clamping surface from an unclamped position to a clamped position without lateral movement of the clamping link towards the first link, and in the clamped position the clamping surface is positionable to apply a clamping force against the underside of the ledge of the cargo box.

15. The tonneau cover system of claim 14, wherein in the unclamped position the first pivot joint is on a first side of a line extending between the second pivot joint and the second coupling of the first link, and in the clamped position the first pivot joint is on a second side opposite the first side of the line in an over-center position.

16. The tonneau cover system according to claim 14, further comprising:

a second pivot link having a first coupling and a second coupling, wherein the first coupling is pivotably coupled to the first coupling of the first link and the second coupling is pivotably coupled to the clamping link.

17. The tonneau cover system according to claim 14, wherein the first end of the clamping link is coupled to the first link.

18. The tonneau cover system according to claim 14, wherein the first end of the clamping link is pivotably coupled to the first coupling of the first link.

19. The tonneau cover system of claim 14, wherein the clamping surface of the clamping link further comprises:

an angle portion extending at an angle relative to the first end of the clamping link and towards the tonneau cover causing the clamping surface to align with the underside of the ledge;

a platform including a first rigid portion, a second rigid portion extending horizontally from the first rigid portion, an elastic member that covers a first surface of the first and second rigid portions, and a coupling member formed on a second surface opposing the first surface of the first and second rigid portions; and a groove adapted to receive the coupling member and to secure the platform.

20. A tonneau cover system for a cargo box of a pickup truck, the cargo box comprising a sidewall including a ledge having an underside and a flange extending downwardly from the ledge, the tonneau cover system comprising:

a tonneau cover positioned over the cargo box; and a clamp coupled to the tonneau cover to secure the tonneau cover to the cargo box, the clamp comprising:

a first link slidably coupled to the tonneau cover;

a handle member pivotably coupled to the first link at a first pivot joint; and a clamping link having a first end pivotably coupled to the handle member at a second pivot joint and a clamping surface remote from the first end;

wherein the handle member is movable between a lowered position and an upper position, movement of the handle member from the lowered position to the upper position causes the clamping link to pivot relative to the first link to raise the clamping surface from an unclamped position to a clamped position without lateral movement of the clamping link towards the first link, and in the clamped position the clamping surface is positionable to apply a clamping force against the underside of the ledge of the cargo box.

21. The tonneau cover system according to claim 20, wherein in the unclamped position the second pivot joint is on a first side of a line extending between the first pivot joint and the first link, and in the clamped position the second pivot joint is on a second side opposite the first side of the line in an over-centered position.

22. The tonneau cover system according to claim 20, wherein the clamping surface of the clamping link further comprises:

an angle portion extending at an angle relative to the first end of the clamping link and towards the tonneau cover causing the clamping surface to align with the underside of the ledge;

a platform including a first rigid portion, a second rigid portion extending horizontally from the first rigid portion, an elastic member that covers a first surface of the first and second rigid portions, and a coupling member formed on a second surface opposing the first surface of the first and second rigid portions; and a groove adapted to receive the coupling member and to secure the platform.

* * * * *